United States Patent
Hopkins et al.

(10) Patent No.: US 10,220,579 B2
(45) Date of Patent: Mar. 5, 2019

(54) INTEGRATED SMART SUSCEPTOR HEATER BLANKET DEBULK SYSTEM FOR COMPOSITES

(71) Applicant: The Boeing Company, Chicago, IL (US)

(72) Inventors: Andrew M. Hopkins, Salt Lake City, UT (US); Donald J. Sutkus, Mercer Island, WA (US); James M. Kestner, Seattle, WA (US); Jennifer S. Noel, Kent, WA (US); Robert J. Miller, Fall City, WA (US); Marc R. Matsen, Seattle, WA (US); Christopher J. Hottes, Seattle, WA (US); Mark E. King, Maple Valley, WA (US); Darren R. Walker, Sandy, UT (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/884,138

(22) Filed: Jan. 30, 2018

(65) Prior Publication Data
US 2018/0147794 A1   May 31, 2018

Related U.S. Application Data

(62) Division of application No. 15/056,783, filed on Feb. 29, 2016, now Pat. No. 9,914,269.

(51) Int. Cl.
*B29C 70/34* (2006.01)
*H05B 3/34* (2006.01)
(Continued)

(52) U.S. Cl.
CPC ............. *B29C 70/342* (2013.01); *H05B 3/34* (2013.01); *H05B 6/105* (2013.01);
(Continued)

(58) Field of Classification Search
CPC ................ B29C 65/3668; B29C 71/04; B29C 2035/0811; B32B 37/12; B32B 37/14; B32B 2038/1891; B32B 2405/00; H05B 1/0272; H05B 6/06; H05B 6/065; H05B 6/10; H05B 6/108; H05B 6/36; H05B 6/362; H05B 6/40
(Continued)

(56) References Cited

U.S. PATENT DOCUMENTS 6,229,126 B1   5/2001   Ulrich et al.
8,330,086 B2   12/2012  Miller et al.
(Continued)

OTHER PUBLICATIONS

Extended European Search Report dated Jul. 27, 2017, in EP Application No. 17157477.5, 8 pages.

*Primary Examiner* — George R Koch
(74) *Attorney, Agent, or Firm* — MH2 Technology Law Group LLP

(57) ABSTRACT

A processing apparatus such as a heating and/or debulking apparatus that may be used to debulk a plurality of uncured composite layers to form an article such as an aircraft component may include a plurality of interconnected smart susceptor heater blankets. The plurality of smart susceptor heater blankets may be connected in series or in parallel, and may be controlled to uniformly heat the component during formation.

20 Claims, 16 Drawing Sheets

(51) Int. Cl.
*H05B 6/10* (2006.01)
*B29K 105/08* (2006.01)
*B29L 31/30* (2006.01)
*B29C 35/08* (2006.01)

(52) U.S. Cl.
CPC ............... *B29C 2035/0811* (2013.01); *B29C 2035/0816* (2013.01); *B29K 2105/089* (2013.01); *B29L 2031/3076* (2013.01); *H05B 2203/003* (2013.01); *H05B 2203/007* (2013.01); *H05B 2206/023* (2013.01); *Y02T 50/43* (2013.01)

(58) Field of Classification Search
USPC .................................................. 156/351, 359
See application file for complete search history.

(56) References Cited

U.S. PATENT DOCUMENTS

| | | | |
|---|---|---|---|
| 8,884,201 B2 | 11/2014 | Matsen et al. | |
| 9,174,398 B2 | 11/2015 | Miller et al. | |
| 2007/0108665 A1* | 5/2007 | Glain | B29C 70/44 264/405 |
| 2008/0251642 A1 | 10/2008 | Boschet et al. | |
| 2012/0145702 A1 | 6/2012 | Miller et al. | |
| 2012/0145703 A1 | 6/2012 | Matsen et al. | |
| 2013/0082047 A1 | 4/2013 | Matsen et al. | |
| 2016/0262215 A1 | 9/2016 | Miller et al. | |
| 2016/0262216 A1 | 9/2016 | Kestner et al. | |
| 2017/0246815 A1 | 8/2017 | Kestner et al. | |
| 2017/0246816 A1 | 8/2017 | Hopkins et al. | |

* cited by examiner

INTEGRATED SMART SUSCEPTOR HEATER BLANKET DEBULK SYSTEM FOR COMPOSITES

CROSS-REFERENCE TO RELATED APPLICATION

This application is a divisional of and claims priority to U.S. patent application Ser. No. 15/056,783 filed Feb. 29, 2016, now U.S. Pat. No. 9,914,269, the disclosure of which is hereby incorporated herein by reference in its entirety.

TECHNICAL FIELD

The present teachings relate to the manufacture of laminated composite materials that include a debulk of an uncured composite laminate to form, for example, a component for an aircraft, aerospace vehicle, or other vehicle.

BACKGROUND

Manufacturing components for vehicles such as aircraft and aerospace vehicles, ground vehicles, etc., from fiber sheets is well known. A composite part including a plurality of composite plies or sheets that are pre-impregnated with an uncured resin (i.e., prepregs) may be assembled during a layup process. During layup, several (i.e., 20, 40, or more) uncured composite plies are stacked, and then air that may be trapped between each of the several plies may be removed using a vacuum during a "debulk" process. Subsequently, the resin may be cured in an oven or an autoclave. During the curing of the resin, the component is supported on a cure tool that maintains the shape of the component while heat is applied to the component to cure the resin.

The debulking and curing of the plurality of composite plies may be performed in an autoclave. Additionally, techniques have been developed for debulking composite parts without the need for an oven or autoclave. For example, a plurality of uncured composite plies may be placed into a vacuum bag and heated to a temperature below the cure temperature. A vacuum is applied to the vacuum bag to remove air from between each adjacent ply. The debulked composite part may then be removed from the vacuum bag and processed such that it is ready to be heated to a cure temperature within an autoclave.

Debulking of components through the application of heat within a vacuum bag is convenient and cost effective for smaller parts. A relatively small heater blanket may be manufactured at reasonable cost and used to debulk smaller components. However, this approach may not be suitable for some components such as aircraft components (e.g., horizontal stabilizers) which may be manufactured as a large single seamless structure.

Accordingly, there is a need for a method and apparatus for OOA debulking of composite parts out-of-autoclave that employ relatively simple and inexpensive cure tooling. There is also a need for a method and apparatus of the type mentioned above that is well suited for processing relatively large scale parts out-of-autoclave using induction heating and smart susceptors to provide precise and uniform temperature control during the debulk process.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for processing an article through an application of heat to the article includes positioning a first smart susceptor heater blanket including a first wire ribbon adjacent to a second smart susceptor heater blanket including a second wire ribbon, placing a plurality of uncured composite plies onto a layup mandrel of a first subsection of a heater blanket apparatus, lowering a second subsection of the heater blanket apparatus to position the first smart susceptor heater blanket and the second smart susceptor heater blanket in proximity to the plurality of uncured composite plies on the layup mandrel, and to position the first smart susceptor heater blanket and the second smart susceptor heater blanket to overlay the layup mandrel and the plurality of uncured composite plies, and applying a current to a plurality of first wire assemblies of the first wire ribbon, wherein each first wire assembly is adjacent to at least one other first wire assembly, such that a current flow through each first wire assembly is in a direction that is opposite to a current flow through any adjacent first wire assembly. The method further includes applying a current to a plurality of second wire assemblies of the second wire ribbon, wherein each second wire assembly is adjacent to at least one other second wire assembly, such that a current flow through each second wire assembly is in a direction that is opposite to a current flow through any adjacent second wire assembly, and the positioning further includes placing one of the first wire assemblies adjacent to one of the second wire assemblies, such that the current flow through the first wire assembly adjacent to the second wire assembly is in an direction that is opposite to the current flow through the adjacent second wire assembly.

In an implementation, the applying of the current to the plurality of first wire assemblies and the applying of the current to the plurality of second wire assemblies can apply the current in series between the first smart susceptor heater blanket and the second smart susceptor heater blanket.

In an implementation, the applying of the current to the plurality of first wire assemblies and the applying of the current to the plurality of second wire assemblies can apply the current in parallel between the first smart susceptor heater blanket and the second smart susceptor heater blanket, which may optionally include applying the current flow to the plurality of first wire assemblies using a first power supply and applying the current flow to the plurality of second wire assemblies using a second power supply.

The method may further include regulating the current flow to the first smart susceptor heater blanket using a controller and regulating the current flow to the second smart susceptor heater blanket using the controller, as well as, optionally, monitoring a plurality of temperatures at a plurality of locations of the first smart susceptor heater blanket using a first plurality of thermal sensors distributed across the first smart susceptor heater blanket, regulating the current flow output by the first power supply to the first smart susceptor heater blanket based on an output received from the first plurality of thermal sensors using the controller, monitoring a plurality of temperatures at a plurality of locations of the second smart susceptor heater blanket using a second plurality of thermal sensors distributed across the second smart susceptor heater blanket, and regulating the current flow output by the second power supply to the second smart susceptor heater blanket based on an output received from the second plurality of thermal sensors using the controller.

The method may further include transmitting an output from a first plurality of thermal sensors distributed across the first smart susceptor heater blanket to a controller, transmitting an output from a second plurality of thermal sensors distributed across the second smart susceptor heater blanket to the controller, regulating the current flow to the second smart susceptor heater blanket based on the output from the first plurality of thermal sensors using the controller, and regulating the current flow to the first smart susceptor heater blanket based on the output from the second plurality of thermal sensors using the controller.

The controller may be a master controller, where the method may further include controlling a first slave controller using the master controller to perform the regulating of the current flow to the first smart susceptor heater blanket, and controlling a second slave controller using the master controller to perform the regulating of the current flow to the second smart susceptor heater blanket.

During the lowering of the second subsection, a vacuum bag may be lowered to overlay the plurality of uncured composite plies, and a vacuum may be applied to the vacuum bag and to the plurality of uncured composite plies. The plurality of uncured composite plies can be heated while applying the vacuum to the vacuum bag and to the plurality of uncured composite plies to debulk the plurality of uncured composite plies.

In another implementation, a method for processing an article through an application of heat to the article includes placing a plurality of uncured composite plies onto a layup mandrel of a first subsection of a heater blanket apparatus, wherein the plurality of uncured composite plies can be cured through the application of heat, lowering a second subsection of the heater blanket apparatus to position a first smart susceptor heater blanket and a second smart susceptor heater blanket in proximity to the plurality of uncured composite plies on the layup mandrel, wherein the first and second smart susceptor heater blankets are self-regulating with regard to temperature, and applying a first electrical current to the first smart susceptor heater blanket wherein, in response to the applying of the first electrical current, the first smart susceptor heater blanket heats and reaches and maintains a first target temperature. Additionally, the method of this implementation includes applying a second electrical current to the second smart susceptor heater blanket wherein, in response to the applying of the second electrical current, the second smart susceptor heater blanket heats and reaches a second target temperature, wherein the first target temperature and the second target temperature are below a cure temperature of the plurality of uncured composite plies.

The first smart susceptor heater blanket may be electrically coupled to the second smart susceptor heater blanket in series, or the first and second smart susceptor heater blankets may be electrically coupled to a power supply in parallel.

The method can optionally include applying the first electrical current to the plurality of first wire assemblies using a first power supply and applying the second electrical current to the plurality of second wire assemblies using a second power supply.

The first electrical current to the first smart susceptor heater blanket may be regulated using a controller, and the second electrical current to the second smart susceptor heater blanket may be regulated using the controller.

This and other implementations may also include monitoring a first plurality of temperatures at a plurality of locations of the first smart susceptor heater blanket using a first plurality of thermal sensors distributed across the first smart susceptor heater blanket, regulating the first electrical current output by the first power supply to the first smart susceptor heater blanket based on an output received from the first plurality of thermal sensors using the controller, monitoring a second plurality of temperatures at a plurality of locations of the second smart susceptor heater blanket using a second plurality of thermal sensors distributed across the second smart susceptor heater blanket, and regulating the second electrical current output by the second power supply to the second smart susceptor heater blanket based on an output received from the second plurality of thermal sensors using the controller.

The method may further include transmitting an output from a first plurality of thermal sensors distributed across the first smart susceptor heater blanket to a controller, transmitting an output from a second plurality of thermal sensors distributed across the second smart susceptor heater blanket to the controller, regulating the first electrical current to the second smart susceptor heater blanket based on the output from the first plurality of thermal sensors using the controller, and regulating the second electrical current to the first smart susceptor heater blanket based on the output from the second plurality of thermal sensors using the controller.

The controller may be a master controller and the method may further include controlling a first slave controller using the master controller to perform the regulating of the first electrical current to the first smart susceptor heater blanket, and controlling a second slave controller using the master controller to perform the regulating of the second electrical current to the second smart susceptor heater blanket.

In this or another implementation, during the lowering of the second subsection, a vacuum bag may be lowered to overlay the plurality of uncured composite plies, a vacuum may be applied to the vacuum bag and to the plurality of uncured composite plies, and the plurality of uncured composite plies may be heated with the first and second smart susceptor heater blankets while applying the vacuum to the vacuum bag and to the plurality of uncured composite plies to debulk the plurality of uncured composite plies.

In an exemplary use, a method for forming an aircraft or aerospace vehicle component includes placing a plurality of uncured composite plies onto a layup mandrel of a first subsection of a heater blanket apparatus, wherein the plurality of uncured composite plies can be cured through the application of heat, lowering a second subsection of the heater blanket apparatus to position a first smart susceptor heater blanket and a second smart susceptor heater blanket in proximity to the plurality of uncured composite plies on the layup mandrel, wherein the first and second smart susceptor heater blankets are self-regulating with regard to temperature, and applying a first electrical current to the first smart susceptor heater blanket wherein, in response to the applying of the first electrical current, the first smart susceptor heater blanket heats and reaches and maintains a first target temperature. The method further includes applying a second electrical current to the second smart susceptor heater blanket wherein, in response to the applying of the second electrical current, the second smart susceptor heater blanket heats and reaches a second target temperature, wherein the first target temperature and the second target temperature are below a cure temperature of the plurality of uncured composite plies. While applying the first electrical current to the first smart susceptor heater blanket and the second electrical current to the second smart susceptor heater blanket, a vacuum is applied to the plurality of uncured composite plies on the layup mandrel, thereby debulking the plurality of uncured composite plies. The method further includes curing the plurality of uncured composite plies.

The method can further include, during the lowering of the second subsection, lowering a vacuum bag to overlay the plurality of uncured composite plies. The method may further include applying the vacuum to the vacuum bag, thereby performing the applying of the vacuum to the plurality of uncured composite plies, and heating the plurality of uncured composite plies while applying the vacuum to the plurality of uncured composite plies during the debulking.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

Figure 1:
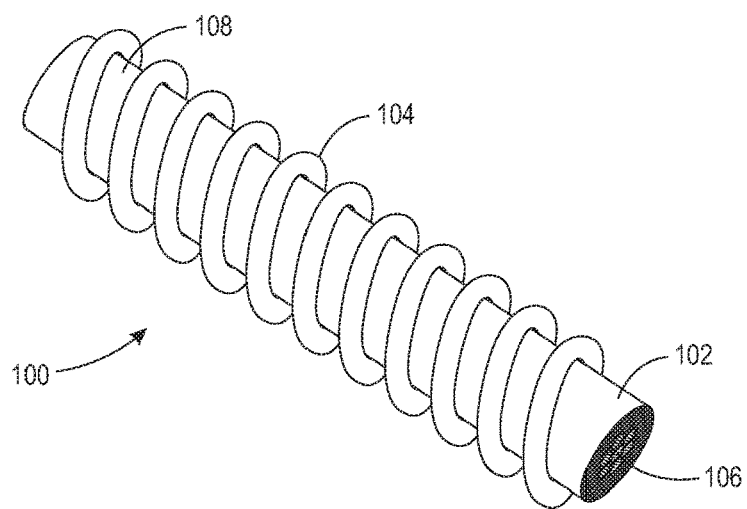
FIG. 1 is a perspective depiction of a wire assembly including a litz wire and a susceptor wire in accordance with an embodiment of the present teachings.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

A smart susceptor heater blanket (hereinafter, "heater blanket") for out-of-autoclave (OOA) curing of a composite patch is described, for example, in U.S. Pat. No. 9,174,398 which is commonly assigned herewith and incorporated herein by reference in its entirety. The heater blanket of the incorporated patent may be used to cure a patch over a relatively small rework area.

An embodiment of the present teachings may provide a method and apparatus for processing large components OOA, for example, debulking of an uncured composite part. The method and apparatus may allow OOA debulking of a large-scale composite part, for example, a plurality of uncured composite plies having a size (e.g., a perimeter, footprint, or outside dimension) that previously required debulking or other processing within an autoclave due to size or other contributing factors. With prior processing, increasing the blanket size to accommodate large-scale composite parts presents several challenges. For example, a large heater blankets require long internal wiring with a high electrical resistance, and therefore require a high current power source to sufficiently power the blanket, which is expensive. Further, very large smart susceptor heater blankets are expensive to manufacture, and the cost of scrapping an unrepairable smart susceptor heater blanket is also expensive. Therefore, large components have most often been both debulked and cured within an autoclave. However, autoclave processing is also expensive as a large volume of process gas such as nitrogen must be heated, cooled, and reheated during debulking of a large-scale composite part within an autoclave. There is also substantial capital cost and manufacturing flow time associated with the use of an autoclave.

An embodiment of the present teachings may include processing apparatus including a plurality of interconnected heater blankets. While the present teachings are generally described with reference to a debulking process for simplicity, it will be understood that other processing, such as curing, is also contemplated.

The debulking apparatus may include a particular electrical design that requires a relatively low current power source and has a low electrical interference between adjacent heater blankets. In an embodiment, the debulking apparatus may include at least two (i.e., two or more) heater blankets, for example, 8, 12, 16, 20, or more interconnected heater blankets, with the number of interconnected heater blankets depending, for example, on the size of the heater blankets and the size of the composite part that is being debulked. A modular heater blanket design in accordance with an embodiment of the present teachings may facilitate simplified replacement and powering of apparatus components at a reduced cost compared to single heater blanket designs.

It will be appreciated that actual assemblies represented by the FIGS. may include other structures that have not been depicted for simplicity, and that depicted structures may be removed or modified.

FIG. 1 is a perspective depiction of a portion of a heater blanket wire assembly 100 that includes a litz wire 102 and a susceptor wire 104 that may wrap around the litz wire 102 in a helix or spiral to form a plurality of susceptor windings around the litz wire. As known in the art, the litz wire 102 includes a plurality of electrically conductive wires 106 electrically insulated from each other, and an electrical insulator 108 interposed between the susceptor wire 104 and the plurality of conductive wires 106. In an embodiment, the wire assembly 100 may have a diameter of from about 0.04" to about 0.08", or about 0.06", as measured on an outside surface of the susceptor wire 104, although other dimensions are contemplated. The wire assembly 100 includes a first end and a second end opposite the first end, wherein the wire assembly 100 extends from the first end to the second end. The length of the wire assembly 100 will depend on the size of the heater blanket that it forms a part of but, in an embodiment, the wire assembly 100 may be from about 5 feet to about 100 feet long.

Figure 2:
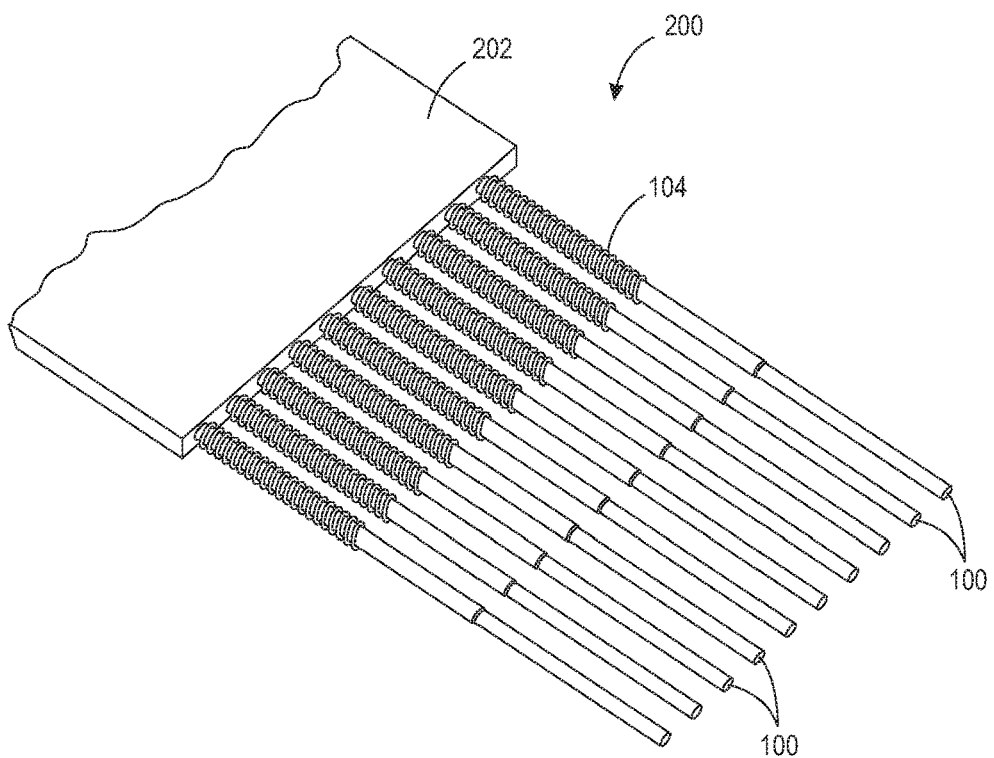
FIG. 2 is a perspective depiction of a wire ribbon including a plurality of wire assemblies in accordance with an embodiment of the present teachings.

FIG. 2 is a cutaway perspective depiction of a portion of a wire ribbon 200 that includes a plurality of individual spaced wire assemblies 100. The plurality of wire assemblies 100 may be encapsulated or otherwise encased together within an electrically insulative and thermally conductive binder 202 such as a silicone binder. In an embodiment, the binder 202 may have a thickness of from about 0.025" to about 0.25", or another thickness that is suitable for transfer of thermal energy generated within the susceptor wires by the flow of current through the litz wires to an adjacent workpiece. The wire ribbon 200 may include any number of wire assemblies 100, for example, at least two, or up to 10 or more wire assemblies 100. The wire ribbon 200 may have a width of from about 0.5" to about 12", or from about 0.5" to about 12", or from about 2" to about 12", or from about 0.5" to about 6.0", or another suitable width depending, for example, on size constraints, electrical constraints, the number of wire assemblies 100 within the wire ribbon 200, etc.

Figure 3:
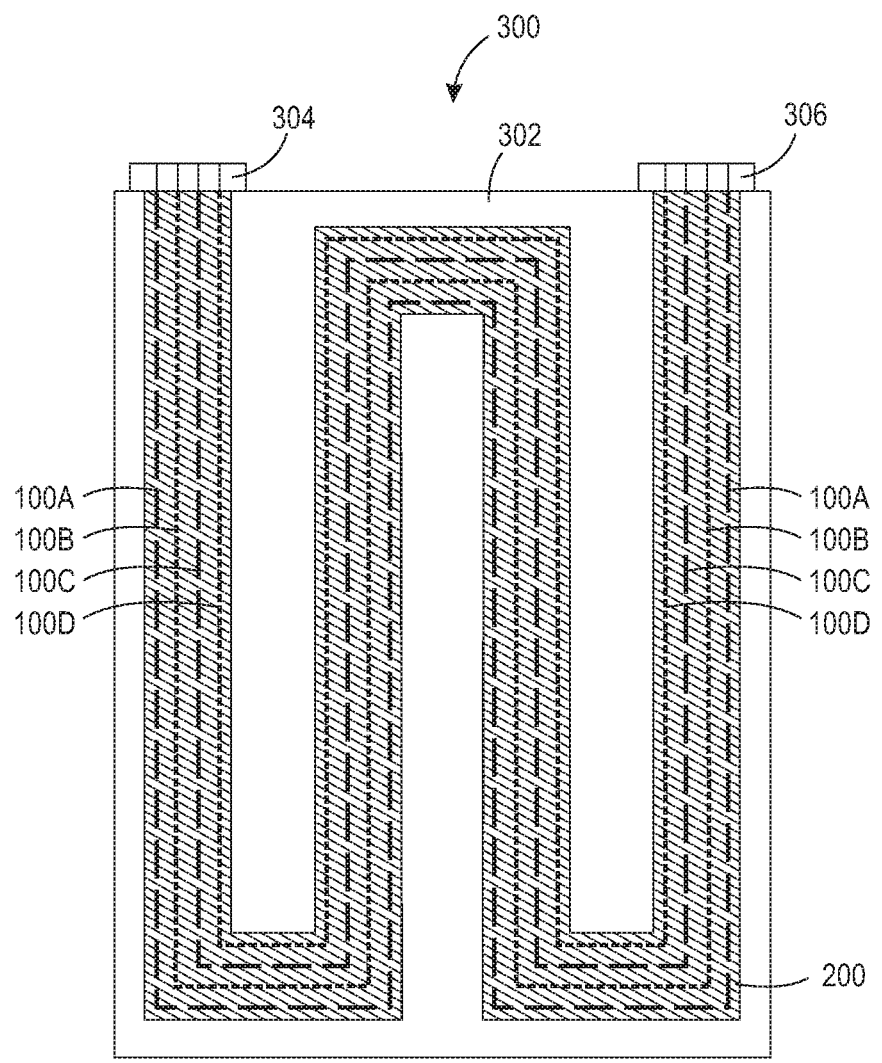
FIG. 3 is a plan view of a smart susceptor heater blanket in accordance with an embodiment of the present teachings.

FIG. 3 is a plan view depicting a heater blanket 300 including the wire ribbon 200 of FIG. 2. For illustration, the wire ribbon 200 of FIG. 3 includes four wire assemblies 100A-100D. The heater blanket 300 may include a blanket substrate 302. In an embodiment, the blanket substrate 302 may include a layer of silicone binder to which the wire ribbon is attached using an attachment such as an adhesive. In another embodiment, the blanket substrate 302 may include two layers of silicone binder, wherein the wire ribbon 200 is interposed between the two layers. In any case, the wire ribbon is positioned to extend back and forth (i.e., serpentine) across the heater blanket as depicted in FIG. 3. While the wire ribbon 200 in FIG. 3 is depicted with three 180° turns for simplicity given the scale of the figure, it will be appreciated that a wire ribbon 200 may include, for example, between six and twelve 180° turns, or eight or more 180° turns as it serpentines across the heater blanket 300. Further, the wire ribbon 200 may be formed as a straight ribbon and folded in a desired pattern to form the heater blanket 300, and may extend across the heater blanket 300 in other patterns. In general, the wire ribbon 200 may cover a suitable percentage of the heater blanket surface area, perimeter, or footprint to maintain even heating of the article being debulked during the debulking process.

The heater blanket 300 further includes a first electrical connector 304 attached to the first end of each wire assembly 100 and a second electrical connector 306 attached to the second end of each wire assembly. In an embodiment, the first electrical connector 304 may be a male type connector and the second electrical connector may be a female type connector. The pair of connectors 304, 306 allows a power source to be electrically coupled to each of the wire assemblies 100A-100D using either a series connection or a parallel connection as described below. Two or more heater blankets 300 may be manufactured.

Figure 4:
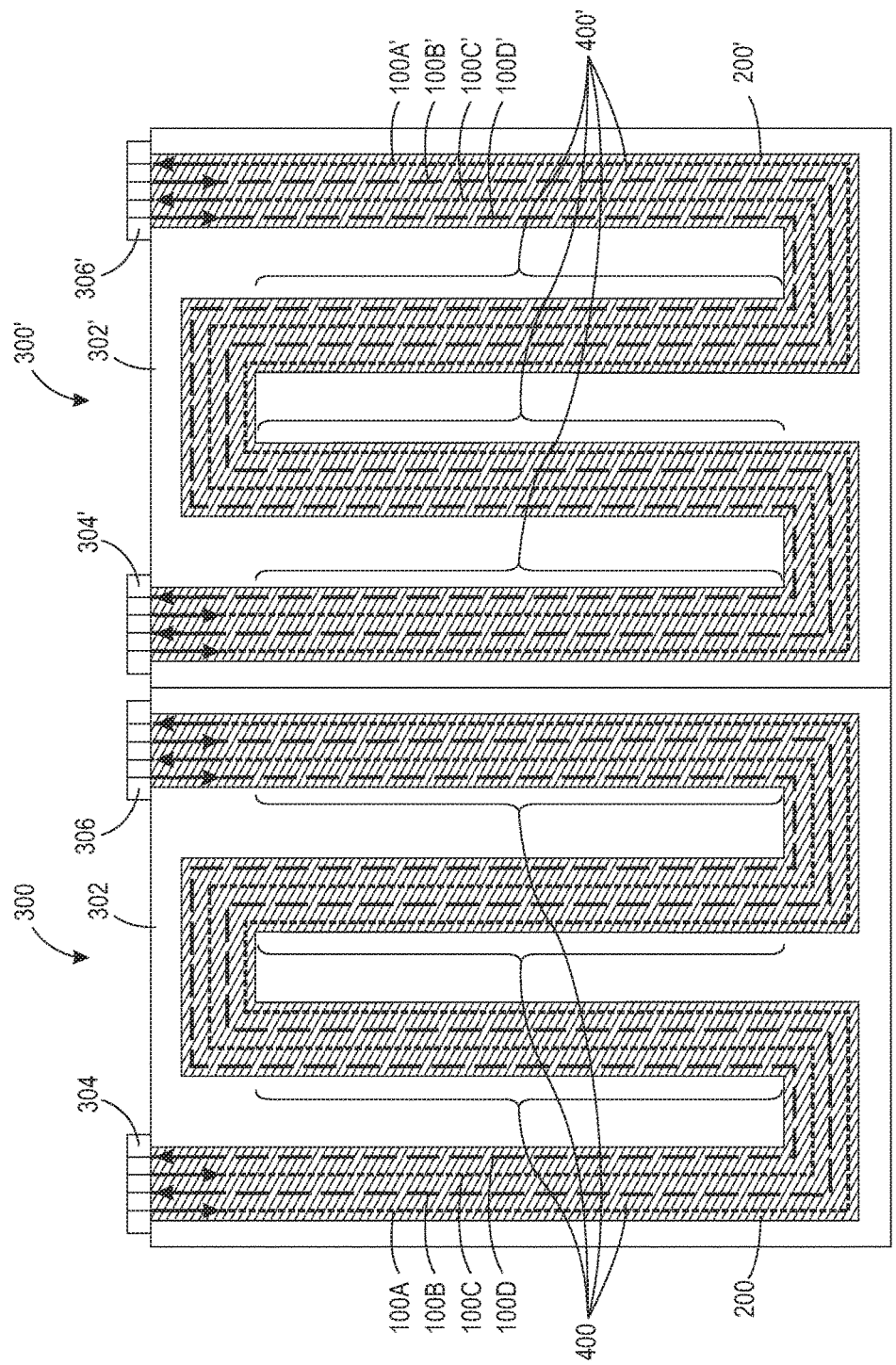
FIG. 4 is a plan view depicting two or more adjacent smart susceptor heater blankets in accordance with an embodiment of the present teachings.

Two or more heater blankets 300 of FIG. 3 may be assembled to form a component of the debulking apparatus as depicted in FIG. 4, which depicts a first heater blanket 300 and a second heater blanket 300 prime (300'), which may be identical or may vary in shape. However, in general, the length of the wire ribbon 200 within each heater blanket may be similar such that both or all heater blankets are matched with respect to power requirements. In an embodiment, the wire ribbon 200 within each heater blanket 300 may be manufactured such that the length of all wire ribbons varies by no more than about ±10% from a target length. In other words, the shortest wire ribbon may have a length no more than 0.9 times the target length of all wire ribbons for the debulking apparatus, and the longest wire ribbon may have a length no more than 1.1 times the target length. This ensures that all heater blankets within the debulking apparatus operate with similar heating and cooling characteristics so that a uniform and predictable temperature may be maintained across the article being debulked. In other embodiments, the wire ribbon 200 within each heater blanket 300 may be manufactured such that the length of all wire ribbons varies by no more than ±20%, or by no more than ±15%. In other embodiments, the variation in length may not a design consideration.

Figure 5:
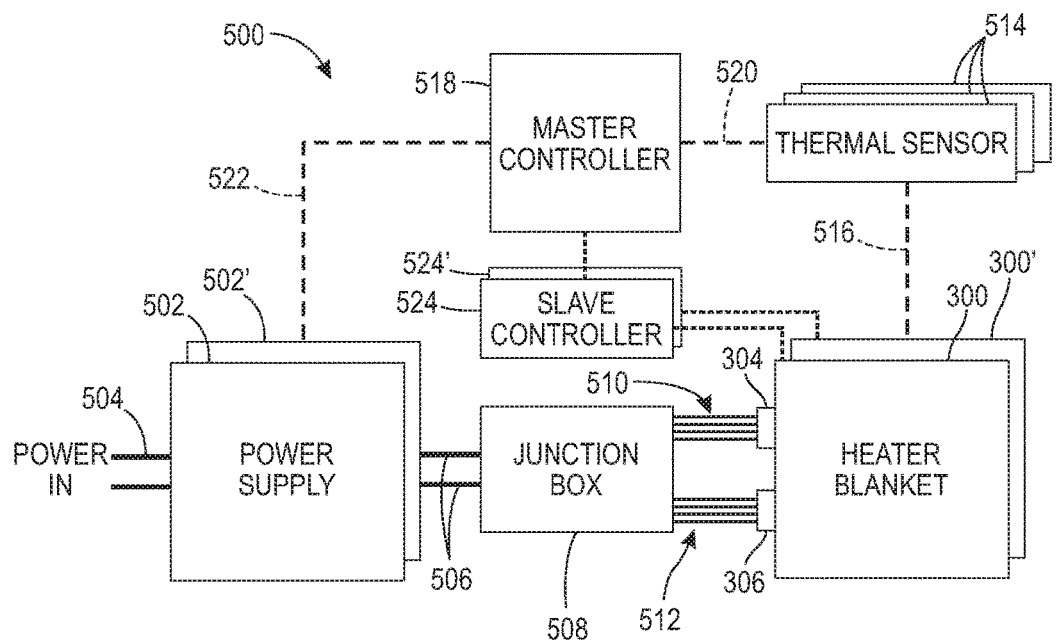
FIG. 5 is a schematic depiction of a processing assembly such as a debulking apparatus in accordance with an embodiment of the present teachings.

FIG. 5 is a block diagram of a heater blanket apparatus 500 that may be part of a debulking apparatus. While the FIG. 5 depiction includes two heater blankets 300, 300' for debulking an uncured composite part in accordance with an embodiment of the present teachings, it will be understood that a heater blanket apparatus 500 may include any number of heater blankets. FIG. 5 depicts one or more power supplies 502, 502' including an input 504 and an output 506. As described below, one power supply 502 may power all heater blankets 300, 300', or separate power supplies 502, 502' may power each heater blanket 300, 300'. FIG. 5 further depicts a junction box 508 having an input (e.g., the output 506 of the power supply 502). The junction box provides a first input/output 510 to each of the first connectors 304, and a second input/output to each of the second connectors 306. The input/outputs 510, 512 from the junction box 508 will depend on the particular design or configuration of the heater blanket apparatus 500 as described below. The heater blankets 300, 300' are electrically coupled with, and receive power through, input/outputs 510, 512 of the junction box 508 through the electrical connectors 304, 306 as depicted.

FIG. 5 further depicts a plurality of thermal sensors 514 such as thermocouples. The thermal sensors 514 are in thermal communication 516 with one or more of the heater blankets 300, 300'. In an embodiment, a plurality of the thermal sensors are in thermal proximity to each of the heater blankets 300, 300' to monitor a temperature of the heater blankets 300, 300', and assist in maintaining a uniform heater blanket temperature range during debulking. The thermal sensors 514 may transfer temperature data to a controller 518, for example, through a wired or wireless connection or interface 520. The controller 518 is in electrical communication with, and controls, the power supply through, for example, a communication cable 522.

The master controller 518 may be electrically coupled with, and control, a plurality of slave controllers 524, 524'. Each slave controller 524, 524' is electrically coupled with one of the heater blankets 300, 300' respectively. Each slave controller 524, 524' monitors and controls one of the heater blankets 300, 300'. Further, each slave controller 524, 524' may receive data and instructions from the master controller 518, and may pass operational data relative to the heater blankets 300, 300' to the master controller 518. The master controller 518 may control the output 506 from the power supplies 502, 502' based on the heater blanket operational data.

During use, each litz wire 102 of each wire ribbon 200 is electrically coupled with the power supply 502. Current from the power supply 502 flowing through the litz wire 102 generates a magnetic field within each susceptor wire 104 of each wire ribbon 200 of each heater blanket 300. The magnetic field, in turn, generates heat within the wire ribbon 200 which thereby heats each heater blanket 300. The susceptor wire includes a Curie temperature ($T_c$), where the Curie temperature results, at least in part, from the particular composition of the susceptor wire. Inductive heating of the susceptor wire may be reduced when the susceptor sleeve becomes non-magnetic upon reaching the Curie temperature. The reduction in the heating of the susceptor sleeve may result in reducing the conductive heating of the structure. At a low temperature, a magnetic permeability of the susceptor wire 104 is high, and thus a skin depth of the susceptor wire 104 is small and the magnetic field induces strong eddy currents having a relatively high thermal output that heats the heater blanket 300. As the temperature of the susceptor wire 104 increases, the magnetic permeability of the susceptor wire 104 decreases to a lower value and the skin depth of the susceptor wire 104 increases. At high temperatures, the skin depth is larger than the radius of the susceptor wire 104, and the eddy currents within the susceptor wire 104 interfere with each other thereby weakening the eddy currents. The weaker eddy currents have a relatively low thermal output and thus the heater blanket 300 generates less heat. Each portion of the susceptor wire 104 thereby becomes its own temperature regulator to maintain a uniform temperature without altering the current applied to the litz wire 102. The temperature self-regulation occurs locally and continuously along the length of each wire ribbon 200, such that the desired temperature within a temperature range is maintained at all locations along the length of the wire ribbon 200 and, therefore, across the area of the heater blanket 300. Unless otherwise noted, as used herein, the terms "smart susceptor heater blanket," "susceptor heater blanket," and "heater blanket" refer to a heater blanket that is capable of temperature self-regulation.

As depicted in FIG. 4, at least two heater blankets 300, 300' are placed adjacent to each other during a debulking operation, for example, to increase the area that may be simultaneously debulked. The two or more heater blankets 300, 300' may be electrically coupled together, either in series or in parallel, and to the power supply 502 as described below.

The arrows positioned near each connector 304, 306 on each wire assembly 100 of FIG. 4 represent a direction of AC current flow at a given point in time that provides a current polarity for each wire assembly 100 and, more particularly, through each litz wire 102 of each wire assembly 100. The current is applied to each litz wire 102 such that the current flows in a direction that is opposite to the direction of current flow through every adjacent litz wire 102. In other words, during use, the current in each wire segment is 180° out of phase with each adjacent wire segment. As depicted in FIG. 4, current flows away from the first connector 304 and toward the second connector 306 for wire assemblies 100A and 100C, and current flows toward the first connector 304 and away from the second connector 306 for wire assemblies 100B and 100D. In other words, current flows in a first direction for wire assemblies 100A and 100C (generally depicted as relatively longer dashed lines) and in a second direction for their respective adjacent wire assemblies 100B and 100D (generally depicted as relatively shorter dashed lines), wherein the second direction is opposite to the first direction.

Additionally, as depicted in FIG. 4, for purposes of description, each wire ribbon 200, 200' may include a plurality of parallel major segments or legs 400, 400' that are positioned adjacent to at least one other major segment 400, 400'. As depicted, the rightmost major segment 400 for heater blanket 300 is positioned adjacent to, and is parallel with, the leftmost major segment 400' for heater blanket 300', such that wire assembly 100A is positioned adjacent to wire assembly 100A'. As depicted, the flow of current through wire assembly 100A in the rightmost major segment 400 is opposite to the flow of current through wire assembly 100A' in the leftmost major segment 400'. It will be realized, however, that this occurs particularly when both blankets are connected to the same power supply. In general, two or more power supplies will operate at somewhat different frequencies and so, in this example, current in the rightmost major segment 400 will be in the opposite direction only about half the time. This will lead to at least a small increase in magnetic fields.

Maintaining the flow of current in opposite directions for all adjacent wire assemblies 100A-100D, 100A'-100D' ensures that any magnetic field not absorbed by the susceptor windings is minimized by cancellation of an opposing field generated by the two adjacent major segments 400. This specific design element of the individual smart susceptor heater blankets 300, at least in part, enables the ability to place two or more heater blankets 300 directly adjacent to one another without causing or resulting in electromagnetic or thermal interference which would affect the heating of the heater blanket 300, the debulking apparatus in general, and any item being heated thereby.

Figure 6:
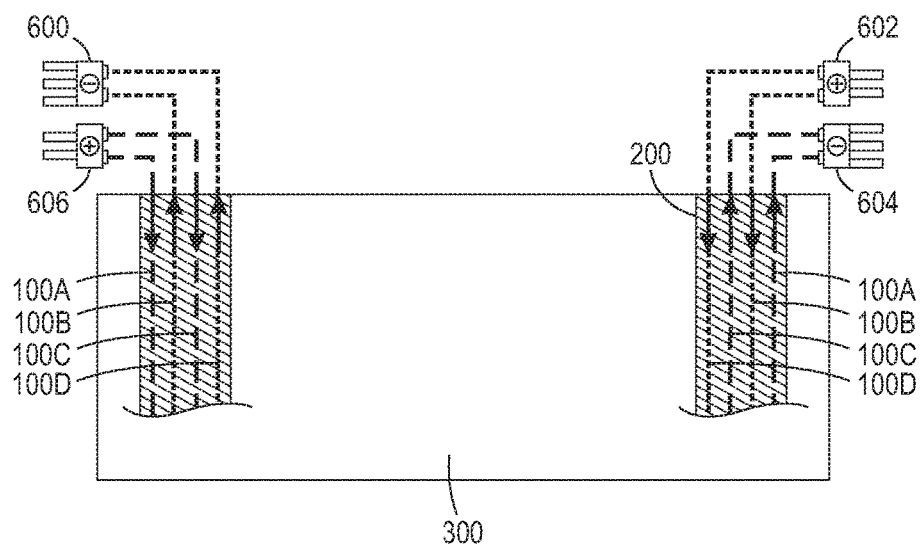
FIG. 6 is a schematic plan view depicting a portion of a smart susceptor heater blanket in accordance with an embodiment of the present teachings.

Various connection configurations for electrically coupling each heater blanket with the power supply and/or the junction box are contemplated. In one embodiment as depicted in FIG. 6, a pair of connector types may be used at each end of the wire ribbon 200. In this embodiment, the litz wires having the same polarity (e.g., the same current flow direction) are grouped into the same connector to enable proper electrical connection to adjacent blankets or electrical coupling to the power supply. In FIG. 6, connector 600 is a female connector having a negative polarity (i.e., current flow toward the connector) that is connected to a first end of wire assemblies 100B and 100D, connector 602 is a male connector having a positive polarity (i.e., current flow away from the connector) that is connected to a second end of wire assemblies 100B and 100D, connector 604 is a female connector having a negative polarity that is connected to a first end of wire assemblies 100A and 100C, and connector 606 is a male connector having a positive polarity that is connected to a second end of wire assemblies 100A and 100C.

Figure 7:
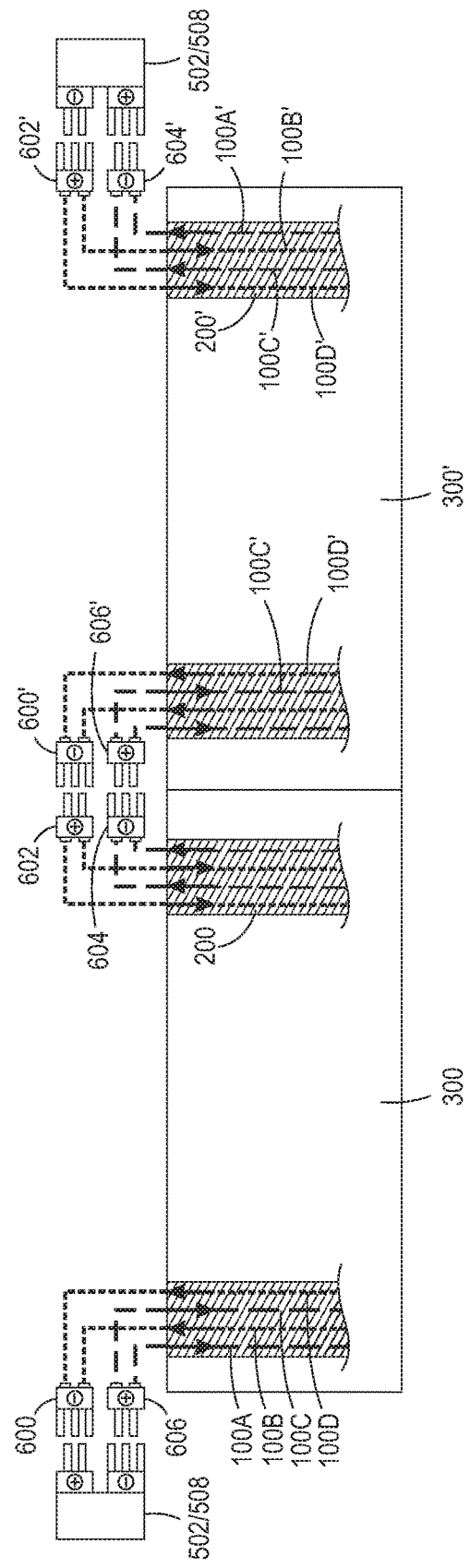
FIG. 7 is a schematic plan view depicting two or more smart susceptor heater blankets to be connected in series in accordance with an embodiment of the present teachings.

FIG. 7 depicts the heater blanket 300 (e.g., a first heater blanket) of FIG. 6 as it may be electrically coupled with a second heater blanket 300' using a series electrical connection (i.e., in series). Connectors 600, 606 of the first heater blanket 300 and connectors 602', 604' of the second heater blanket 300' are electrically connected or coupled with the power supply 502 and/or junction box 508, for example through electrical connectors as depicted. Connectors 602, 604 of the first heater blanket 300 are electrically connected to connectors 600', 606' of the second heater blanket 300' as depicted.

Figure 8:
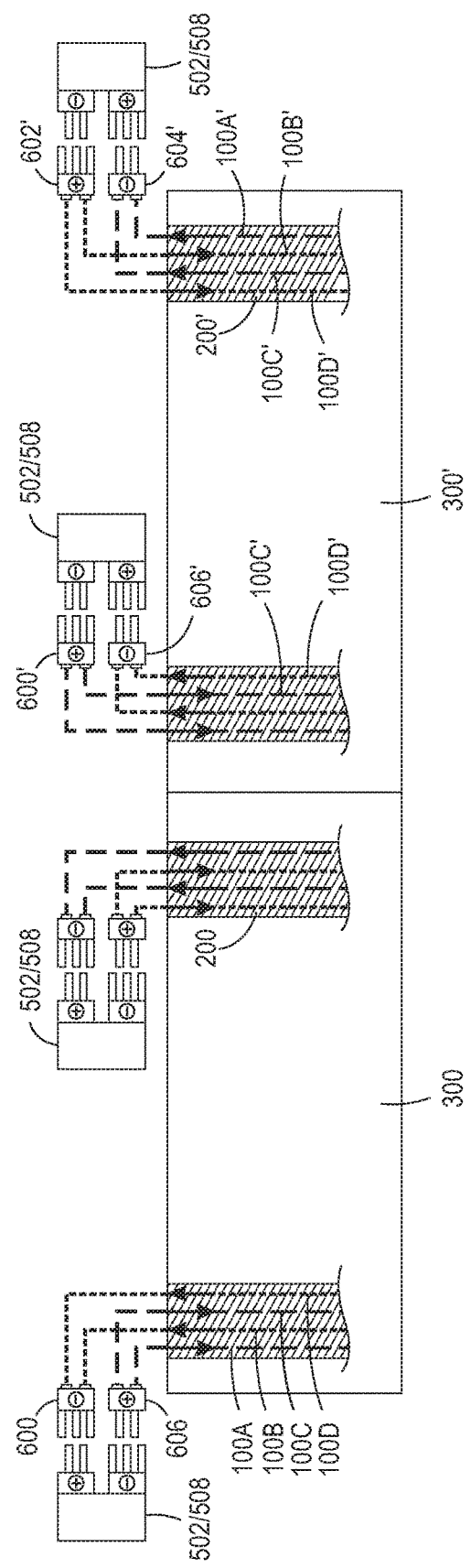
FIG. 8 is a schematic plan view depicting two or more smart susceptor heater blankets to be connected in parallel in accordance with an embodiment of the present teachings.

FIG. 8 depicts the first heater blanket 300 as it may be electrically coupled with the second heater blanket 300' using a parallel electrical connection (i.e., in parallel). Each of the electrical connectors 600-606, 600'-606' are electrically connected or coupled with the power supply 502 and/or junction box 508, for example through electrical connectors as depicted. In an embodiment, each power supply 502 of FIG. 8 is the same power supply 502. In another embodiment, each power supply 502 of FIG. 8 is a different power supply 502, for example, to reduce the current requirements for each power supply.

Figure 9:
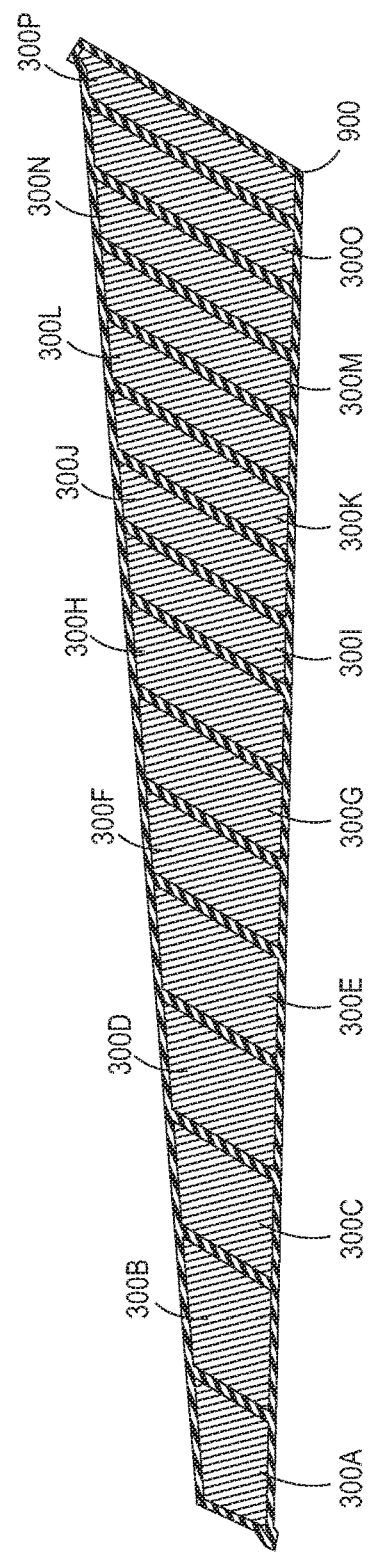
FIG. 9 is a plan view depicting a plurality of smart susceptor heater blankets and an uncured composite part to be debulked in accordance with an embodiment of the present teachings.
Figure 10:
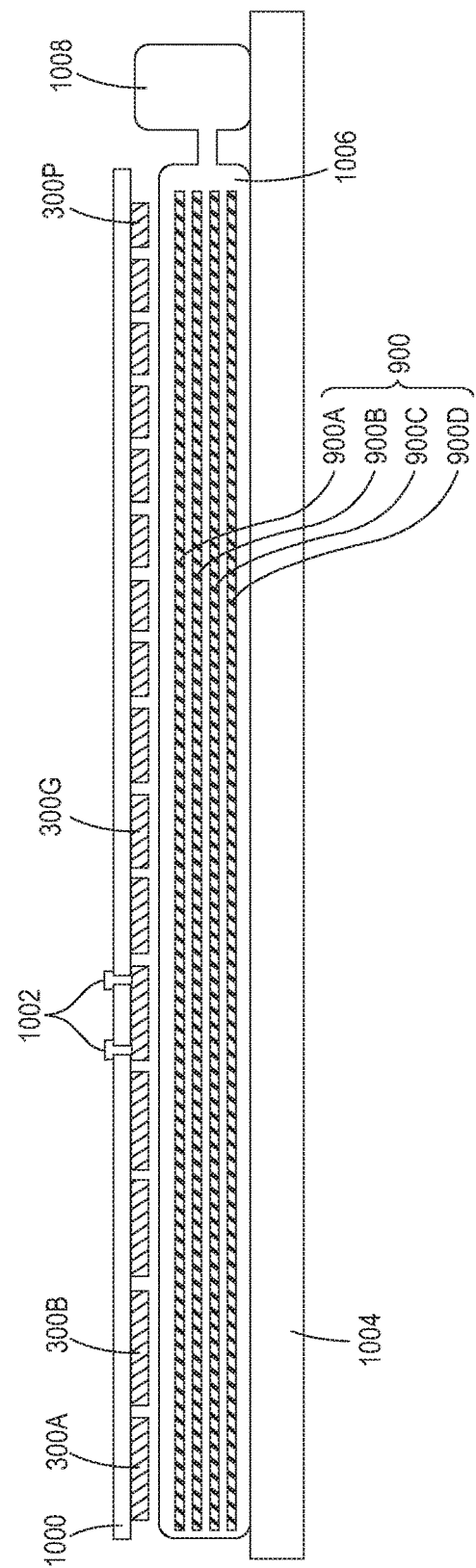
FIG. 10 is a cross section depicting a plurality of smart susceptor heater blankets and an uncured composite part to be debulked in accordance with an embodiment of the present teachings.

FIG. 9 is a plan view, and FIG. 10 is a cross section, of a debulking assembly including a plurality of heater blankets 300A-300P during use, and an uncured composite part or article 900 to be debulked. In this embodiment, 16 heater blankets (e.g., corresponding to 16 heating zones) 300A-300P are placed adjacent to each other and electrically coupled to a power supply, for example, as described above or using another connection design. In an embodiment, each heater blanket 300A-300P may be attached to a different power supply as described above, for example, to reduce current requirements. While FIG. 10 depicts the heater blankets 300A-300P overlying the composite part 900, the composite part 900 may be placed over the heater blankets 300A-300P. It will be realized that heater blankets may also be placed both over and under the composite part 900 during debulking. Further, while the composite part 900 of FIG. 10 depicts four laminate layers 900A-900D such as prepregs, it will be appreciated that the composite part 900 may include any number of laminate layers to be laminated together, for example, 40 or more layers. Further, composite part 900 may include a three dimensional (3D) woven prepreg rather than a laminate.

In FIG. 9, the plurality of heater blankets 300A-300P include individualized shapes that are designed to conform to the shape of the composite part 900 being debulked. Each heater blanket of the plurality of heater blankets 300A-300P may have the same, or different, perimeter lengths and shapes as all other heater blankets 300A-300P. Some heater blankets of the plurality of heater blankets 300A-300P may have the same perimeter lengths and shapes as other heater blankets 300A-300P, while other heater blankets have different perimeter shapes and lengths as other heater blankets 300A-300P. In an embodiment, each heater blanket 300A-300P may have a wire ribbon 200 as described above. In an embodiment including only a single power supply that powers every heater blanket 300A-300P, each wire ribbon for each heater blanket 300A-300P may be designed to have a length that varies no more than ±20%, or no more than ±15%, or no more than ±10% from a common target value, such that the power requirements for each heater blanket 300A-300P are matched and similar to all other heater blankets 300A-300P. The plurality of heater blankets 300A-300P may be mechanically attached to a mounting surface or support 1000 using, for example, a plurality of fasteners 1002 (depicted only on heater blanket 300E in FIG. 10 for simplicity). The fasteners 1002 may maintain each blanket in a fixed position relative to one or more adjacent blankets. The composite part 900 may rest on a base or working surface 1004, such as a contoured layup mandrel, during debulking. In an embodiment where each heater blanket 300A-300P is powered by a separate power supply, the output of all power supplies may be the same, or the output may be matched for the requirement of the heater blanket that it powers.

In an embodiment, the composite part 900 may be placed into a vacuum bag 1006 that is attached to a vacuum source 1008 during debulking. During a debulking operation, electrical power is applied to each of the heater blankets 300A-300P while a vacuum is applied to the vacuum bag 1006 by the vacuum source 1008. The heater blankets 300A-300P may be designed to reach and maintain a target temperature such that the requirements for debulking the composite part 900 are met, and thus heat the composite part 900 to a desired temperature. The smart susceptor effect provides localized temperature control to account for variations in thermal load.

In an embodiment, each of the 16 heater blankets may be controlled through the use of 16 slave controllers 524 (FIG. 5), wherein each slave controller 524 controls and monitors one of the heater blankets 300A-300P. In an embodiment, the master controller 518 (FIG. 5) may define a ramp of temperature of each heater blanket 300A-300P, either directly or through the slave controllers 524, until each heater blanket 300A-300P reaches a temperature target or set point. The 16 slave controllers power the 16 heater blankets via feedback control loop based on temperature values within each zone measured, for example, using thermal sensors 514. Software within the controller 518 may include a software algorithm that surveys multiple temperatures in each zone. The highest temperature from a plurality of measurement points may be used for control at every point in time. The highest temperature during the temperature ramp may change from location to location within a zone over the duration of the temperature ramp and/or temperature dwell.

Each of the one or more power supplies may include load tuning that may be used to monitor a health of each smart susceptor heater blanket 300A-300P. The master controller 518 and/or slave controllers 524 may monitor the health of each heater blanket 300A-300P, both prior to and during the debulking operation. The controller 518 may further monitor operation of the vacuum source 1008 and the vacuum within the vacuum bag 1006. Process data may be continuously captured and logged within a data file before, during, and after a debulking operation for real-time or subsequent analysis.

It will be appreciated that the plurality of heater blankets 300A-300P may be assembled into an enclosure or interposed between two or more rigid and/or flexible layers such that the plurality of modular heater blankets 300A-300P become subassemblies of a heater blanket assembly.

Figure 11:
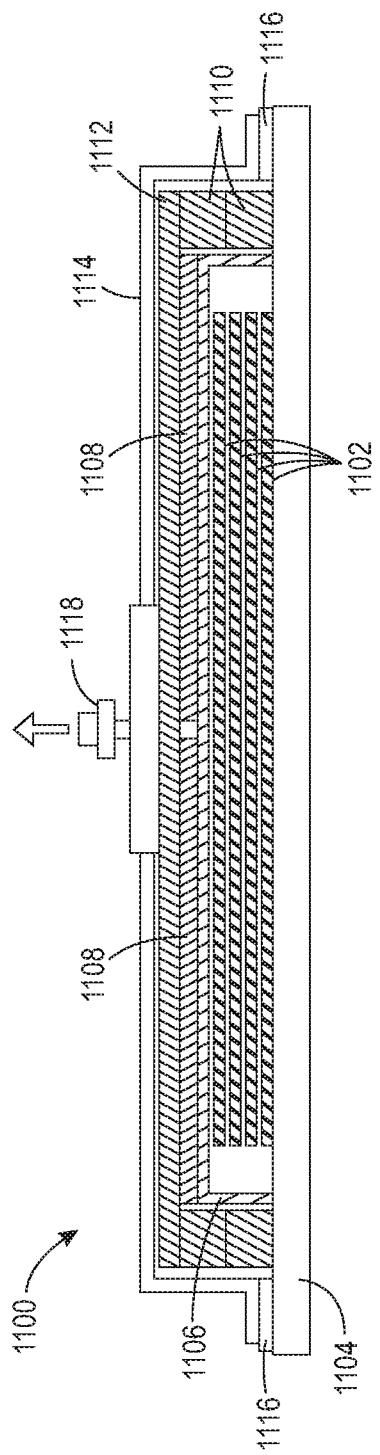
FIG. 11 is a cross section of a heater blanket assembly and composite layers to be processed within the heater blanket assembly.

Various embodiments for processing a composite part are contemplated. For example, FIG. 11 is a cross section of a heater blanket apparatus 1100 during an OOA process for debulking a plurality of layers 1102, although it will be understood that other processing, such as a curing process, etc., may be performed using the application of heat from a heater blanket apparatus 1100. While FIG. 11 depicts four layers 1102 such as four prepreg layers to be debulked, any number of layers 1102 such as 40 or more layers may be debulked. The layers 1102 may be stacked onto a layup mandrel 1104 such as an invar caul plate.

In addition to the layers 1102 to be debulked and the layup mandrel 1104, FIG. 11 depicts a protective release layer 1106, two or more heater blankets 1108, one or more breather layers 1110, 1112, and a vacuum bag 1114 sealed to the layup mandrel 1104 with a double-sided adhesive 1116. The protective release layer 1106 may be, for example, fluorinated ethyl propylene (FEP), ethylene tetrafluoroethylene (ETFE), or another suitable material. The vacuum bag 1114 may have an opening that receives a vacuum port 1118.

During debulking, a vacuum is applied to the layers 1102 by exhausting air, nitrogen, or another gas through the vacuum port 1118 using a vacuum source 1008 (FIG. 10). During the debulking, current is applied to each of the heater blankets 1108 to heat the heater blankets 1108 which, in turn, heats the layers 1102 during the debulking process. While the processing parameters may vary, in one process, the heater blankets may be ramped to a target temperature of 160° F.±10° F. During the temperature ramp, a temperature of the heater blankets 1108 is monitored using, for example, thermal sensors 514 (FIG. 5). During the temperature ramp, when a thermal sensor detects a temperature of, for example, 110° F., the master controller 518 may begin a process timer while the temperature increases to the 160° F. target, and during further processing. Once the process timer reaches a desired value, for example, three hours, the current may be removed from the heater blankets 1108 and the heater blanket apparatus 1100 may be allowed to cool. Process data logging may continue until a specified temperature is reached, for example, 110° F. Once a process termination temperature is measured by the thermal sensors, 514, the interior of the heater blanket apparatus 1100 may be vented, the vacuum bag 1114 may be removed, and the debulked layers 1102 may be moved to an autoclave or oven for final curing.

In this embodiment, two or more heater blankets 1108 are positioned within the vacuum bag 1114 during the debulk of layers 1102. The debulking of layers 1102 may thus be performed out of an autoclave or oven. This embodiment thus provides a single-sided heating source (heater blankets 1108) that provides local heating directly to a large skin laminate (layers 1102) for debulk. The direct application of local heating may result in a laminate debulk that is comparable to results obtained by traditional debulk methods, with various advantages. For example, the process described above does not require heating of an entire volume of an oven or autoclave, thereby reducing processing time and energy costs. The heating is provided by an alternating current (AC) and/or direct current (DC) power supply, and thus no natural gas is required, thereby simplifying facility requirements. Additionally, because heating is localized, cooling of the assembly may be relatively rapid without the need for active cooling. Further, the entire tool and supporting structure is used to form the laminate to its desired shape, which reduces space requirements compared to an autoclave or oven. As described above, the smart susceptor heater blankets are self-regulating with regard to temperature. The wire assembly 100 continues to heat, thereby heating the smart susceptor heater blanket and the layers 1102, until the susceptor wire 104 reaches its Curie temperature ($T_c$) locally. Once the $T_c$ is reached, local heating ceases until the susceptor wire 104 cools to below the $T_c$ and heating begins again. Thus the heater blanket and the layers 1102 being heated by the heater blanket obtain a desired temperature without overheating.

Figure 12:
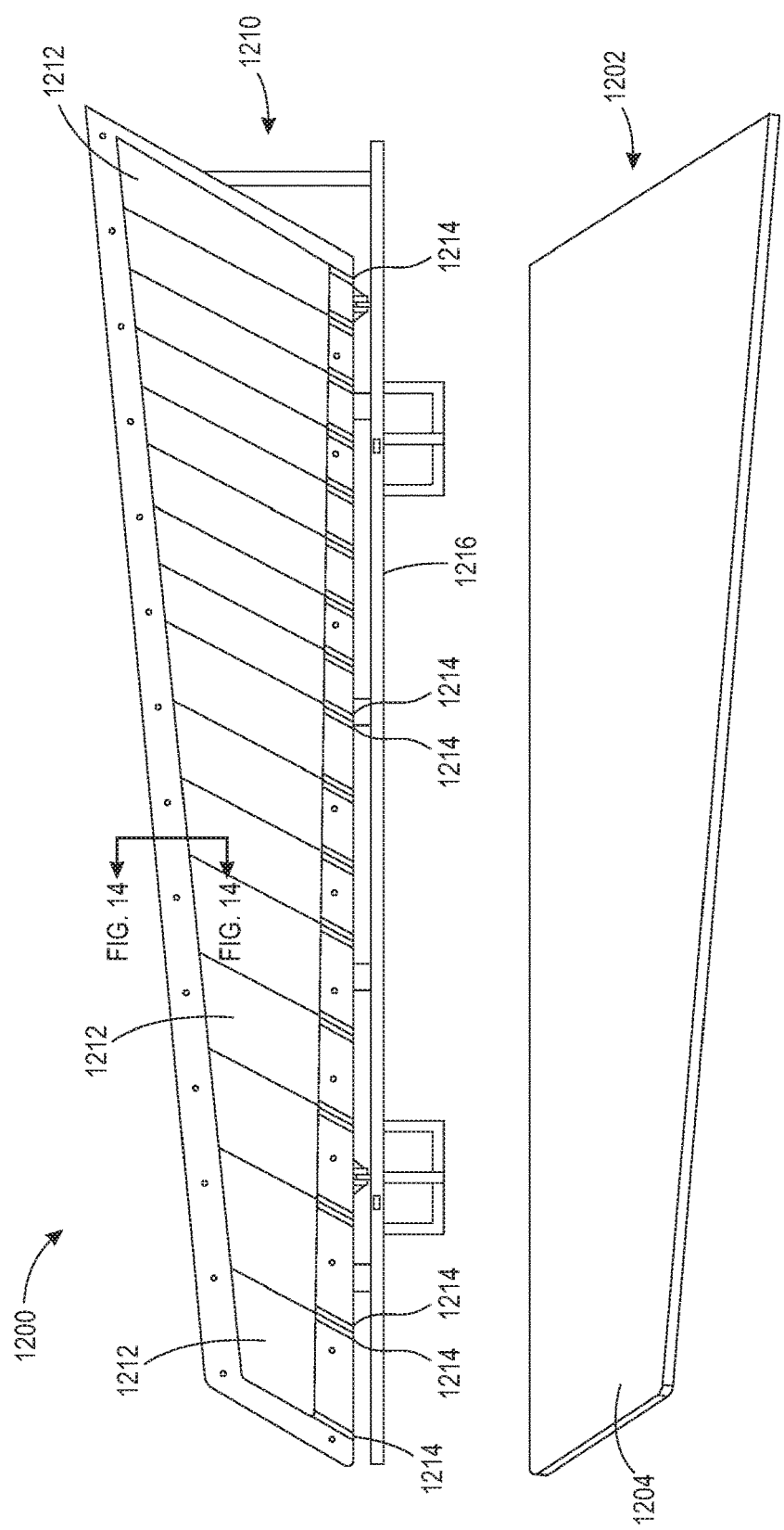
FIG. 12 is a schematic perspective depiction of a heater blanket apparatus including a plurality of heater blankets in accordance with an embodiment of the present teachings.

FIG. 12 is a schematic perspective depiction of another embodiment of a heater blanket apparatus 1200 that may be used, for example, for debulking a plurality of uncured plies of a composite laminate. In FIG. 12, a plurality of heater blankets are mounted to a frame or fixture to provide a heater blanket apparatus for heating a plurality of layers during processing such as a debulking operation. The FIG. 12 depiction includes a first subsection 1202 having a layup mandrel 1204 and a second subsection 1210 having 16 separate heater blankets 1212, although a heater blanket apparatus having two or more heater blankets 1212 is contemplated. Each heater blanket 1212 is electrically coupled with a power supply through one or more cables 1214 connected to the wire ribbon 200, for example, with a first connector 304. The plurality of heater blankets 1212 may be connected to the power supply either in parallel (as depicted in FIG. 12) or in series. Series and parallel connections are described above. During debulking, the second subsection 1210 may be lowered onto the first subsection 1202, wherein the laminate layers to be debulked are interposed between the first subsection 1202 and the second subsection 1210 and, more particularly, between the layup mandrel 1204 and the heater blankets 1212. The plurality of heater blankets 1212 may be supported by a frame 1216.

Figure 13:
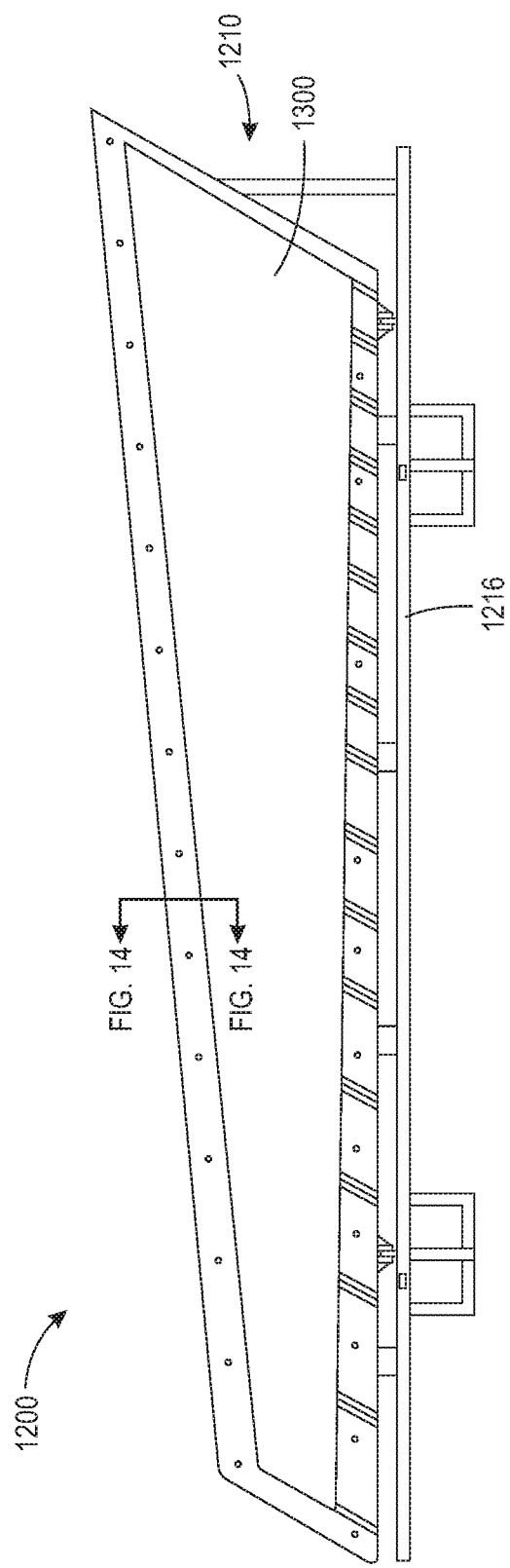
FIG. 13 depicts a portion of the FIG. 12 structure prior to attaching the plurality of heater blankets.

FIG. 13 depicts the second subsection 1210 prior to installation of the heater blankets 1212, and depicts a vacuum bag 1300 wherein, during debulking, the plurality of heater blankets 1212 are interposed between the vacuum bag 1300 and the layers to be debulked. The vacuum bag 1300, in part, allows a vacuum to be formed around the layers to be debulked.

Figure 14:
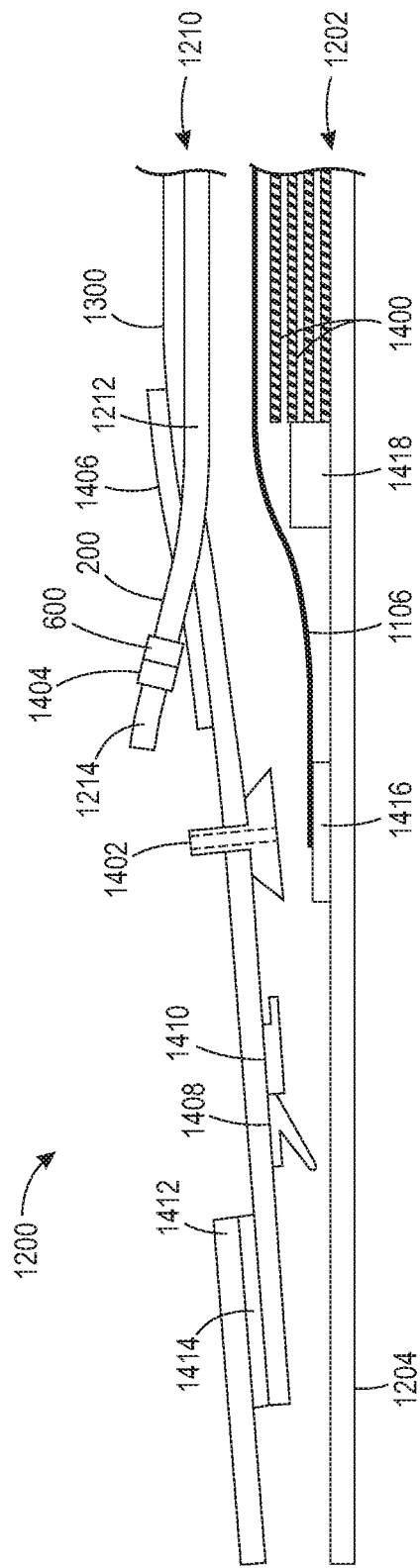
FIG. 14 is a cross section of a portion of the FIG. 12 structure.

FIG. 14 is a cross section depicting a portion of the first subsection 1202 and the second subsection 1210, with a plurality of uncured composite plies 1400 prior to debulking. FIG. 14 depicts a vacuum port 1402 that extends through the vacuum bag 1300. When in fluid communication with the vacuum source 1008 (FIG. 10), the vacuum port 1402 allows a vacuum to be applied to the composite plies 1400 during debulking by venting air, nitrogen, vapors, or another gas. FIG. 14 further depicts one of the plurality of cables 1214 electrically connected to one of the heater blankets 1212 using a first connector 600 and a second connector 1404. A reinforcement seal 1406 may be attached to an upper surface of the vacuum bag 1300 to prevent tearing around an opening through which the wire ribbon 200 extends, and to form a seal to prevent loss of the vacuum during debulking.

The second subsection 1210 may include other features as necessary to maintain a vacuum during processing. For example, FIG. 14 depicts an elongated seal 1408, such as an elongated T7™ seal or another reusable elongated seal, typically including silicone or another sufficient material, that physically contacts, and maintains a seal with, the layup mandrel 1204 during processing, and a spacer 1410 that spaces the vacuum bag 1300 from the layup mandrel 1204 to maintain the vacuum.

FIG. 14 further depicts one of a plurality of straps 1412 that attaches the second subsection 1210 to a portion of the frame 1216, for example, to an I-beam as described below. The plurality of straps 1412 may be manufactured from a material such as fiberglass-reinforced silicon. The plurality of straps 1412 may be attached to the second subsection 1210 and, more particularly, to the vacuum bag 1300, using silicone adhesive. A reinforcing layer 1414, for example fiberglass-reinforced silicone, may be interposed between the plurality of straps 1412 and the vacuum bag 1300 to reduce or prevent damage to the vacuum bag 1300 during use.

The heater blanket apparatus 1200 of FIG. 14 may include other structures, such as an edge breather 1416 that physically contacts the vacuum port 1402 and spaces the vacuum port 1402 from the layup mandrel 1204. The edge breather 1416 may be a porous layer that allows air and/or other gases to be evacuated away from the composite plies 1400 and through the vacuum port 1402 during the debulking of the composite plies 1400. The edge breather 1416 may be, for example, one or more layers of Airtech Airweave® N-10. FIG. 14 further depicts a protective release layer 1106 as described above, for example FEP, and an edge dam 1418 that may be used to align and position the plurality of composite plies 1400.

Figure 15:
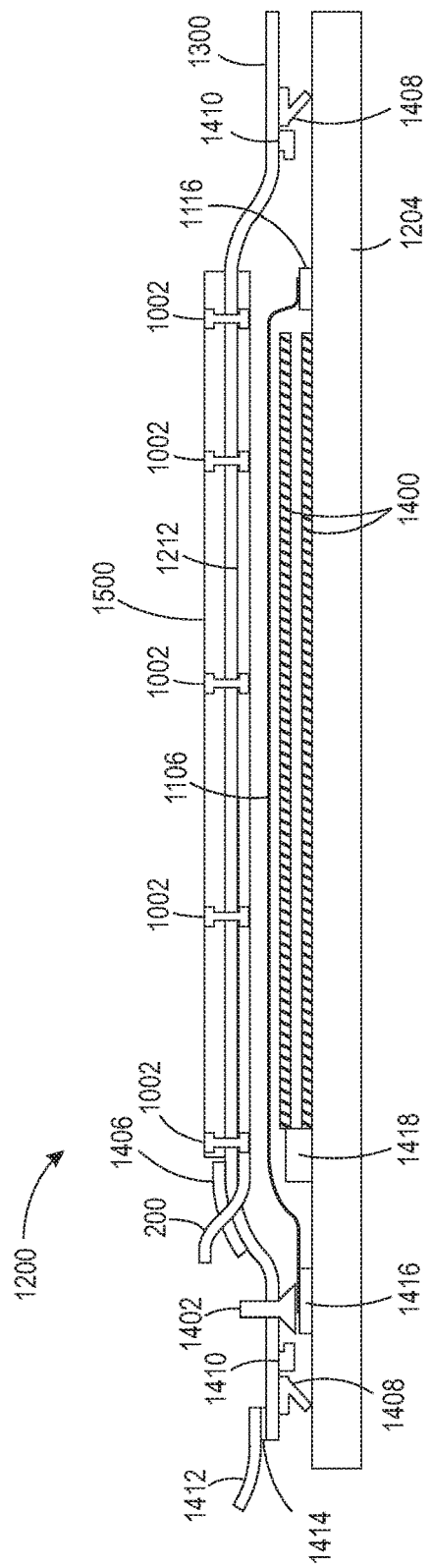
FIG. 15 is a cross section of the FIG. 12 structure during debulking or other processing.

FIG. 14 depicts detail of the FIG. 15 structure. FIG. 15 further depicts fasteners 1002 that may be used to physically and mechanically connect the plurality of heater blankets 1212 to the vacuum bag 1300 and to a mounting surface or support 1500. As depicted, the blanket apparatus 1200 may include additional elongated seals 1408 that physically contact, and maintain a seal with, the layup mandrel 1204 during processing, and spacers 1410 that space the vacuum bag 1300 from the layup mandrel 1204 to maintain the vacuum.

Figure 16:
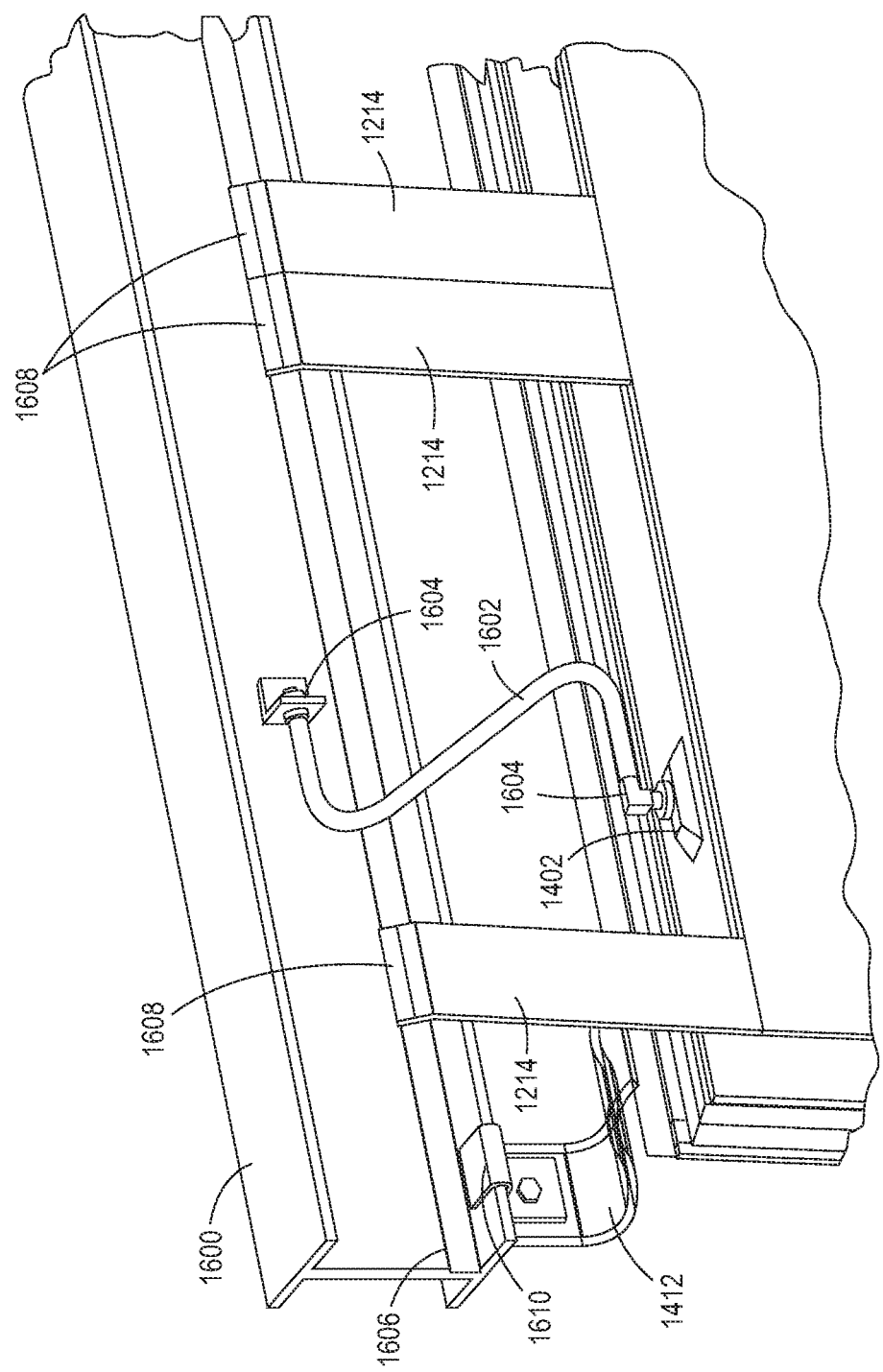
FIG. 16 is a perspective depiction of routing of power and vacuum to the FIG. 12 structure.

FIG. 16 depicts a support beam 1600 such as an I-beam or other rigid beam that may be part of the frame 1216 (FIG. 12). The support beam 1600 may be used as an attachment point for routing power, vacuum, etc., for connection to the second subsection 1210. FIG. 16 depicts a vacuum hose 1602 connected at a first end to the I-beam and at a second end to the vacuum port 1402. The vacuum hose 1602 may include fittings 1604 appropriate for connection to the vacuum port 1402 and the vacuum supply 1008 (FIG. 10). A power cable 1606 electrically coupled with one or more power supplies 502, for example, through a junction box 508 may be routed along the I-beam for electrical connection with the cables 1214 connected to the wire ribbon 200 of the heater blankets 1212. The power cable 1606 may include electrical connectors 1608 that facilitate electrical connection with the cables 1214. Each of the plurality of straps 1412 may be physically connected to the support beam 1600 using a bracket 1610. The straps 1412 are used to support the vacuum bag 1300 and other structures of the second subsection 1210 when in the resting/storage position.

During a debulking or other heating process, referring to FIG. 14, the plurality of layers 1400 to be debulked may be placed on the layup mandrel 1204. The second subsection 1210 may then lowered onto the first subsection 1202 such that the plurality of heater blankets 1212 are in physical proximity to, and in thermal communication with, the plurality of layers 1400. As depicted, the protective release layer 1106 may be interposed between the plurality of heater blankets 1212 and the plurality of layers 1400. It will be understood that the structure of FIG. 14 may include other features, structures, or layers that have not been depicted for simplicity, while depicted elements may be removed or modified.

Figure 17:
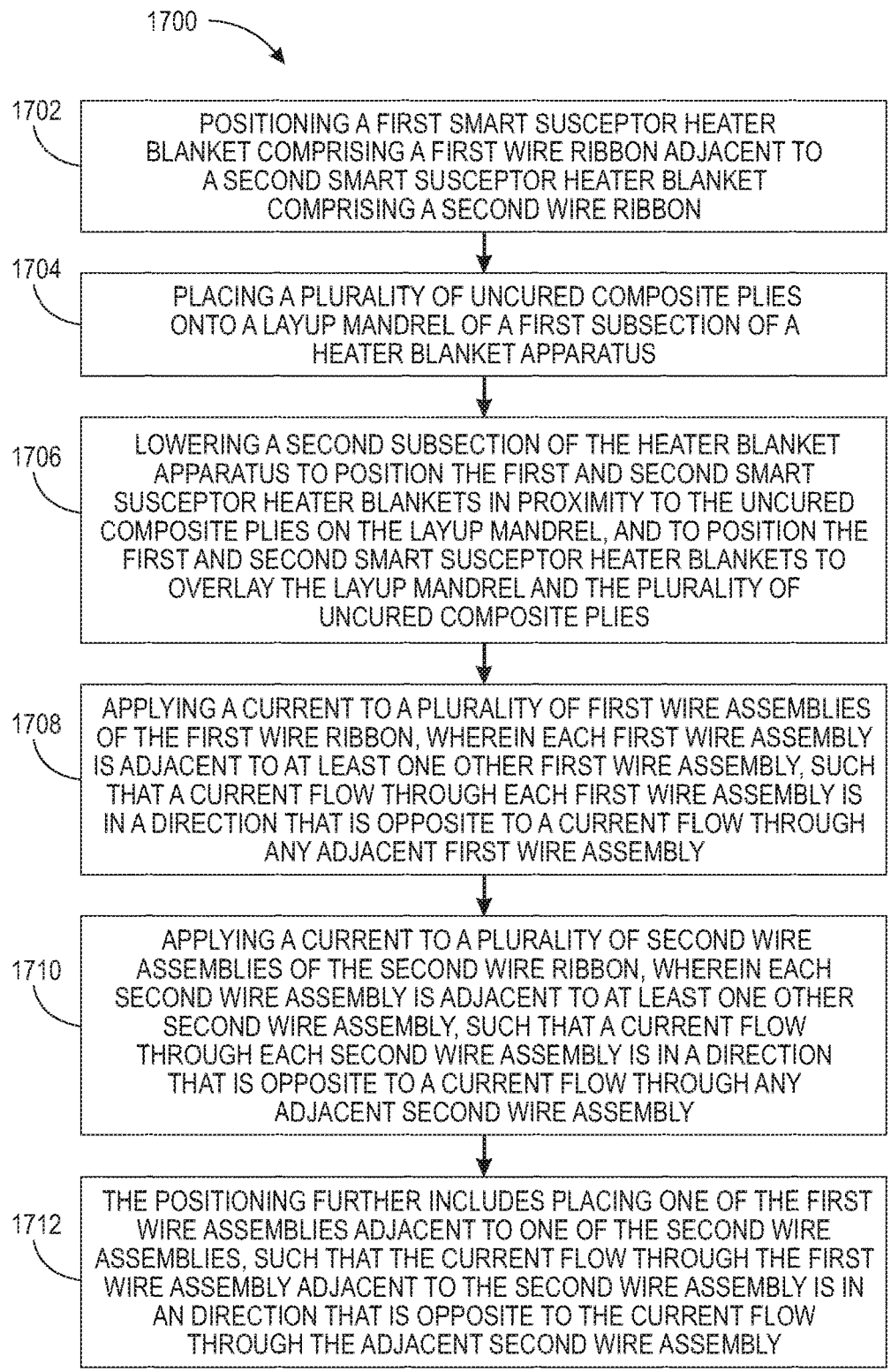
FIG. 17 is a flow chart of a method according to the present teachings.

FIG. 17 is a flow chart depicting a method 1700 for processing an article through an application of heat to the article according to an embodiment of the present teachings. The method may include positioning a first smart susceptor heater blanket including a first wire ribbon adjacent to a second smart susceptor heater blanket including a second wire ribbon as shown at 1702. At 1704, a plurality of uncured composite plies may be placed onto a layup mandrel of a first subsection of a heater blanket apparatus. Next, as shown at 1706, a second subsection of the heater blanket apparatus may be lowered to position the first smart susceptor heater blanket and the second smart susceptor heater blanket in proximity to the plurality of uncured composite plies on the layup mandrel, and to position the first smart susceptor heater blanket and the second smart susceptor heater blanket to overlay the layup mandrel and the plurality of uncured composite plies. At 1708, a current may be applied to a plurality of first wire assemblies of the first wire ribbon, wherein each first wire assembly is adjacent to at least one other first wire assembly, such that a current flow through each first wire assembly is in a direction that is opposite to a current flow through any adjacent first wire assembly. At 1710, a current may be applied to a plurality of second wire assemblies of the second wire ribbon, wherein each second wire assembly is adjacent to at least one other second wire assembly, such that a current flow through each second wire assembly is in a direction that is opposite to a current flow through any adjacent second wire assembly. At 1712, the positioning further includes placing one of the first smart susceptor heater blanket adjacent to the second smart susceptor heater blanket may position one of the first wire assembly adjacent to one of the second wire assemblies, such that the current flow through the first wire assembly adjacent to the second wire assembly is in an direction that is opposite to the current flow through the adjacent second wire assembly.

It will be appreciated that, one or more of the acts depicted herein, for example, in FIG. 17, may be carried out in one or more separate acts and/or phases, and/or in a different order than that depicted.

Figure 18:
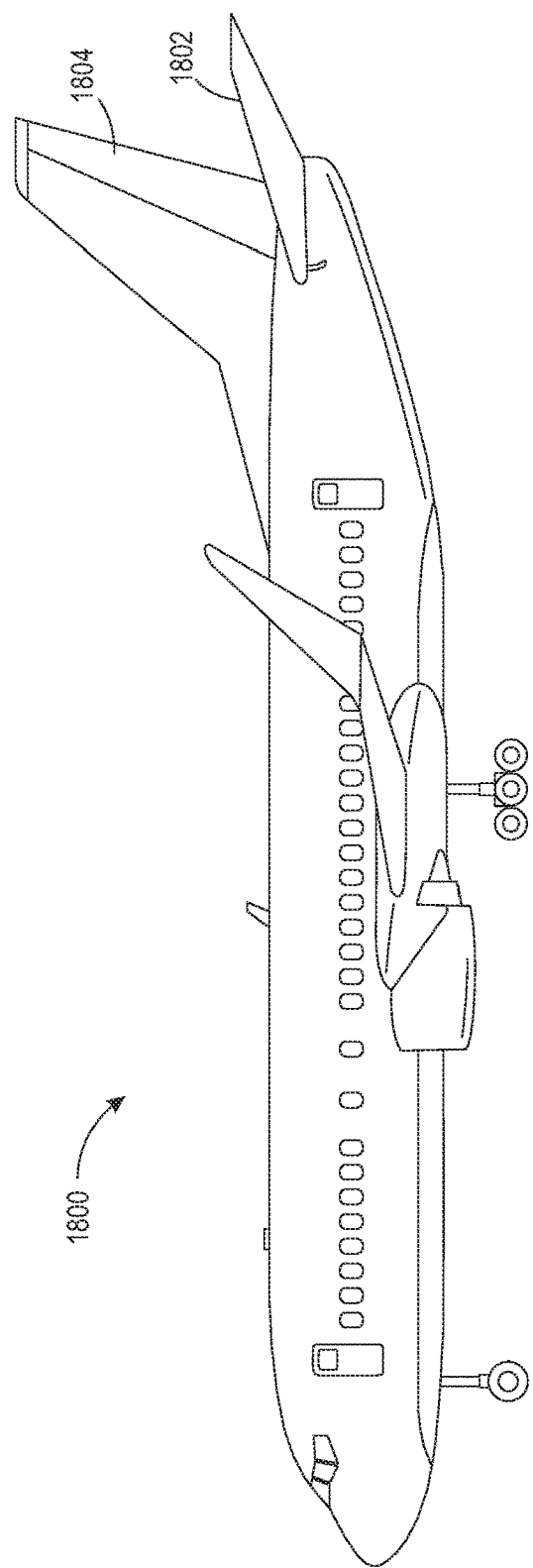
FIG. 18 is a side view of an aircraft including one or more composite parts formed using an embodiment of the present teachings.

The apparatus described herein may be used for debulking of a composite part or for other processing operations. For example, FIG. 18 depicts an aircraft 1800 that includes composite parts that may be debulked or otherwise processed using an embodiment of the present teachings. In one particular used, a horizontal stabilizer 1802, a vertical stabilizer 1804, and/or other aircraft structures may be processed as described above.

The design of the individual smart susceptor heater blankets thus enables the ability to place the heater blankets directly adjacent to one another without causing electromagnetic or thermal interference between heater blankets. Within each wire ribbon, and in the outermost conductors of adjacent wire ribbons, the currents in any two adjacent conductors will, in general, always travel in opposing directions. This ensures that any magnetic field not absorbed by the susceptor windings is minimized by cancellation of an opposing field generated by the two adjacent wires. Other embodiments are contemplated, for example, where the conductors at blanket edges are powered by different power supplies. In general, the heater blankets are relatively large and contain many conductors and so any interference between the outermost conductors on adjacent blankets will be manageably small.

The use of several interconnected heater blankets further allows for debulking or other processing of larger workpieces outside of an autoclave than was previously practical using a single large heater blanket. Damage to a large heater blanket results in the replacement of the entire heater blanket. If damage occurs to one of the heater blankets of the assembly described herein, the modular design using a plurality of heater blankets results in the replacement of only one of the subunits. Further, the high current and voltage needed to drive a plurality of litz wires within single large blanket is expensive and hazardous to manufacturing personnel. Powering multiple heater blankets using multiple power supplies allows for use of lower current and voltages, which improve safety for manufacturing personnel.

It will be appreciated that the structures described herein as a vacuum bag may be, in some embodiments, a vacuum bag such as a disposable vacuum bag or single-use vacuum bag that provides a vacuum chamber into which the workpiece is inserted and then sealed within during a debulking process (see, for example, the vacuum bag 1006 of FIG. 10). In other embodiments, a vacuum bag may be a vacuum membrane such as a single sheet, or two or more laminated sheets, of pliable material that, together with another structure such as the layup mandrel, form an enclosed and sealed vacuum chamber that is used to provide a vacuum around the workpiece (see, for example, the vacuum membrane 1114 of FIG. 11 and the vacuum membrane 1300 of FIG. 13).

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for processing an article through an application of heat to the article, comprising:
    positioning a first smart susceptor heater blanket comprising a first wire ribbon adjacent to a second smart susceptor heater blanket comprising a second wire ribbon;
    placing a plurality of uncured composite plies onto a layup mandrel of a first subsection of a heater blanket apparatus;
    lowering a second subsection of the heater blanket apparatus to position the first smart susceptor heater blanket and the second smart susceptor heater blanket in proximity to the plurality of uncured composite plies on the layup mandrel, and to position the first smart susceptor heater blanket and the second smart susceptor heater blanket to overlay the layup mandrel and the plurality of uncured composite plies;
    applying a current to a plurality of first wire assemblies of the first wire ribbon, wherein each first wire assembly is adjacent to at least one other first wire assembly, such that a current flow through each first wire assembly is in a direction that is opposite to a current flow through any adjacent first wire assembly;
    applying a current to a plurality of second wire assemblies of the second wire ribbon, wherein each second wire assembly is adjacent to at least one other second wire assembly, such that a current flow through each second wire assembly is in a direction that is opposite to a current flow through any adjacent second wire assembly; and
    the positioning further comprises placing one of the first wire assemblies adjacent to one of the second wire assemblies, such that the current flow through the first wire assembly adjacent to the second wire assembly is in a direction that is opposite to the current flow through the adjacent second wire assembly.

2. The method of claim 1, wherein the applying of the current to the plurality of first wire assemblies and the applying of the current to the plurality of second wire assemblies applies the current in series between the first smart susceptor heater blanket and the second smart susceptor heater blanket.

3. The method of claim 1, wherein the applying of the current to the plurality of first wire assemblies and the applying of the current to the plurality of second wire assemblies applies the current in parallel between the first smart susceptor heater blanket and the second smart susceptor heater blanket.

4. The method of claim 3, further comprising:
applying the current flow to the plurality of first wire assemblies using a first power supply; and
applying the current flow to the plurality of second wire assemblies using a second power supply.

5. The method of claim 4, further comprising:
regulating the current flow to the first smart susceptor heater blanket using a controller; and
regulating the current flow to the second smart susceptor heater blanket using the controller.

6. The method of claim 5, further comprising:
monitoring a plurality of temperatures at a plurality of locations of the first smart susceptor heater blanket using a first plurality of thermal sensors distributed across the first smart susceptor heater blanket;
regulating the current flow output by the first power supply to the first smart susceptor heater blanket based on an output received from the first plurality of thermal sensors using the controller;
monitoring a plurality of temperatures at a plurality of locations of the second smart susceptor heater blanket using a second plurality of thermal sensors distributed across the second smart susceptor heater blanket; and
regulating the current flow output by the second power supply to the second smart susceptor heater blanket based on an output received from the second plurality of thermal sensors using the controller.

7. The method of claim 1, further comprising:
transmitting an output from a first plurality of thermal sensors distributed across the first smart susceptor heater blanket to a controller;
transmitting an output from a second plurality of thermal sensors distributed across the second smart susceptor heater blanket to the controller;
regulating the current flow to the second smart susceptor heater blanket based on the output from the first plurality of thermal sensors using the controller; and
regulating the current flow to the first smart susceptor heater blanket based on the output from the second plurality of thermal sensors using the controller.

8. The method of claim 7, wherein the controller is a master controller and the method further comprises:
controlling a first slave controller using the master controller to perform the regulating of the current flow to the first smart susceptor heater blanket; and
controlling a second slave controller using the master controller to perform the regulating of the current flow to the second smart susceptor heater blanket.

9. The method of claim 1, further comprising:
during the lowering of the second subsection, lowering a vacuum bag to overlay the plurality of uncured composite plies;
applying a vacuum to the vacuum bag and to the plurality of uncured composite plies; and
heating the plurality of uncured composite plies while applying the vacuum to the vacuum bag and to the plurality of uncured composite plies to debulk the plurality of uncured composite plies.

10. A method for processing an article through an application of heat to the article, comprising:
placing a plurality of uncured composite plies onto a layup mandrel of a first subsection of a heater blanket apparatus, wherein the plurality of uncured composite plies can be cured through the application of heat;
lowering a second subsection of the heater blanket apparatus to position a first smart susceptor heater blanket and a second smart susceptor heater blanket in proximity to the plurality of uncured composite plies on the layup mandrel, wherein the first and second smart susceptor heater blankets are self-regulating with regard to temperature;
applying a first electrical current to the first smart susceptor heater blanket wherein, in response to the applying of the first electrical current, the first smart susceptor heater blanket heats and reaches and maintains a first target temperature;
applying a second electrical current to the second smart susceptor heater blanket wherein, in response to the applying of the second electrical current, the second smart susceptor heater blanket heats and reaches a second target temperature, wherein the first target temperature and the second target temperature are below a cure temperature of the plurality of uncured composite plies;
removing the first electrical current from the first smart susceptor heater blanket and the second current from the second smart susceptor heater blanket prior to curing of the plurality of uncured composite plies; then
moving the plurality of uncured composite plies to an autoclave or oven for curing of the plurality of uncured composite plies.

11. The method of claim 10, wherein the first smart susceptor heater blanket is electrically coupled to the second smart susceptor heater blanket in series.

12. The method of claim 10, further comprising electrically coupling the first and second smart susceptor heater blankets to a power supply in parallel.

13. The method of claim 10, further comprising:
applying the first electrical current to the plurality of first wire assemblies using a first power supply; and
applying the second electrical current to the plurality of second wire assemblies using a second power supply.

14. The method of claim 13, further comprising:
regulating the first electrical current to the first smart susceptor heater blanket using a controller; and
regulating the second electrical current to the second smart susceptor heater blanket using the controller.

15. The method of claim 14, further comprising:
monitoring a first plurality of temperatures at a plurality of locations of the first smart susceptor heater blanket using a first plurality of thermal sensors distributed across the first smart susceptor heater blanket;
regulating the first electrical current output by the first power supply to the first smart susceptor heater blanket based on an output received from the first plurality of thermal sensors using the controller;
monitoring a second plurality of temperatures at a plurality of locations of the second smart susceptor heater blanket using a second plurality of thermal sensors distributed across the second smart susceptor heater blanket; and
regulating the second electrical current output by the second power supply to the second smart susceptor heater blanket based on an output received from the second plurality of thermal sensors using the controller.

16. The method of claim 10, further comprising:
transmitting an output from a first plurality of thermal sensors distributed across the first smart susceptor heater blanket to a controller;

transmitting an output from a second plurality of thermal sensors distributed across the second smart susceptor heater blanket to the controller;

regulating the first electrical current to the second smart susceptor heater blanket based on the output from the first plurality of thermal sensors using the controller; and regulating the second electrical current to the first smart susceptor heater blanket based on the output from the second plurality of thermal sensors using the controller.

17. The method of claim 16, wherein the controller is a master controller and the method further comprises:

controlling a first slave controller using the master controller to perform the regulating of the first electrical current to the first smart susceptor heater blanket; and controlling a second slave controller using the master controller to perform the regulating of the second electrical current to the second smart susceptor heater blanket.

18. The method of claim 10 further comprising:

during the lowering of the second subsection, lowering a vacuum bag to overlay the plurality of uncured composite plies;

applying a vacuum to the vacuum bag and to the plurality of uncured composite plies; and heating the plurality of uncured composite plies with the first and second smart susceptor heater blankets while applying the vacuum to the vacuum bag and to the plurality of uncured composite plies to debulk the plurality of uncured composite plies.

19. A method for forming an aircraft or aerospace vehicle component, comprising:

placing a plurality of uncured composite plies onto a layup mandrel of a first subsection of a heater blanket apparatus, wherein the plurality of uncured composite plies can be cured through the application of heat;

lowering a second subsection of the heater blanket apparatus to position a first smart susceptor heater blanket and a second smart susceptor heater blanket in proximity to the plurality of uncured composite plies on the layup mandrel, wherein the first and second smart susceptor heater blankets are self-regulating with regard to temperature;

applying a first electrical current to a plurality of first wire assemblies within a first wire ribbon of the first smart susceptor heater blanket such that a current flow through each first wire assembly is in a direction that is opposite to a current flow through any adjacent first wire assembly wherein, in response to the applying of the first electrical current, the first smart susceptor heater blanket heats and reaches and maintains a first target temperature;

applying a second electrical current to a plurality of second wire assemblies within a second wire ribbon of the second smart susceptor heater blanket such that a current flow through each second wire assembly is in a direction that is opposite to a current flow through any adjacent second wire assembly wherein, in response to the applying of the second electrical current, the second smart susceptor heater blanket heats and reaches a second target temperature, wherein the first target temperature and the second target temperature are below a cure temperature of the plurality of uncured composite plies;

while applying the first electrical current to the first smart susceptor heater blanket and the second electrical current to the second smart susceptor heater blanket, applying a vacuum to the plurality of uncured composite plies on the layup mandrel, thereby debulking the plurality of uncured composite plies; and curing the plurality of uncured composite plies.

20. The method of claim 19, further comprising:

during the lowering of the second subsection, lowering a vacuum bag to overlay the plurality of uncured composite plies;

applying the vacuum to the vacuum bag, thereby performing the applying of the vacuum to the plurality of uncured composite plies; and heating the plurality of uncured composite plies while applying the vacuum to the plurality of uncured composite plies during the debulking.

* * * * *